US008508650B2

(12) United States Patent
Akamatsu et al.

(10) Patent No.: US 8,508,650 B2
(45) Date of Patent: Aug. 13, 2013

(54) IMAGE PICKUP SYSTEM, IMAGE PICKUP APPARATUS, AND PROGRAM (75) Inventors: Norihiko Akamatsu, Tokyo (JP); Yoshitaka Miyatani, Tokyo (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/280,812

(22) Filed: Oct. 25, 2011

(65) Prior Publication Data
US 2012/0162492 A1 Jun. 28, 2012

(30) Foreign Application Priority Data

Dec. 27, 2010 (JP) ................................. 2010-289483

(51) Int. Cl.
*H04N 5/232* (2006.01)
(52) U.S. Cl.
USPC ............ 348/345; 348/350; 348/340; 348/375
(58) Field of Classification Search
USPC ......................................... 348/340, 345, 375
See application file for complete search history.

(56) References Cited

U.S. PATENT DOCUMENTS

| 4,627,699 | A | * | 12/1986 | Takagi | 396/89 |
| 4,694,151 | A | * | 9/1987 | Yoshimura | 250/201.2 |
| 5,053,798 | A | * | 10/1991 | Ohara et al. | 396/135 |
| 5,455,650 | A | * | 10/1995 | Fujiwara | 396/71 |
| 6,924,842 | B2 | * | 8/2005 | Yahagi | 348/360 |
| 7,085,485 | B2 | * | 8/2006 | Sugita et al. | 396/71 |
| 7,233,358 | B2 | * | 6/2007 | Yoshikawa | 348/340 |
| 7,260,322 | B2 | * | 8/2007 | Ide et al. | 396/71 |
| 7,330,647 | B2 | * | 2/2008 | Sasaki et al. | 396/130 |
| 7,570,299 | B2 | * | 8/2009 | Kuwakino | 348/350 |
| 7,848,630 | B2 | * | 12/2010 | Yahagi | 396/111 |

(Continued)

FOREIGN PATENT DOCUMENTS

| JP | 2000-156823 | 6/2000 |
| WO | WO 2008/099605 A1 | 8/2008 |

OTHER PUBLICATIONS

U.S. Appl. No. 13/283,978, filed Oct. 28, 2011, Murashima, et al.

*Primary Examiner* — Tuan Ho
*Assistant Examiner* — Angel L Garces-Rivera
(74) *Attorney, Agent, or Firm* — Sony Corporation (57) ABSTRACT

An image pickup system includes an image pickup apparatus and a mount adaptor that adjusts a flange focal length between the image pickup apparatus and an interchangeable lens. The mount adaptor includes a phase-difference focus detection unit that can output a first phase-difference focus detection signal, and an optical device that separates first incident light into second and third incident light. The first incident light is transmitted from the interchangeable lens. The second incident light enters the image pickup apparatus. The third incident light enters the phase-difference focus detection unit. The image pickup apparatus includes an image pickup device that can output a second phase-difference focus detection signal, and a controller that selects either of the first phase-difference focus detection signal and the second phase-difference focus detection signal on the basis of satisfaction of a predetermined condition and performs focusing.

18 Claims, 10 Drawing Sheets

(56) References Cited

U.S. PATENT DOCUMENTS

| | | | |
|---|---|---|---|
| 2002/0140839 A1* | 10/2002 | Yahagi | 348/345 |
| 2003/0173494 A1* | 9/2003 | Nakamura | 250/201.2 |
| 2005/0140815 A1* | 6/2005 | Nakano et al. | 348/345 |
| 2005/0237417 A1* | 10/2005 | Miyasaka | 348/335 |
| 2006/0165403 A1* | 7/2006 | Ito | 396/123 |
| 2007/0047953 A1* | 3/2007 | Kawai | 396/544 |
| 2007/0206937 A1* | 9/2007 | Kusaka | 396/89 |
| 2007/0269197 A1* | 11/2007 | Ide et al. | 396/125 |
| 2010/0091175 A1 | 4/2010 | Shintani et al. | |
| 2011/0228127 A1* | 9/2011 | Nakagawa | 348/222.1 |
| 2012/0092545 A1* | 4/2012 | Sugawara | 348/345 |

\* cited by examiner

| AF-SENSOR AF AREA | IMAGE-SENSOR AF AREA |
|---|---|
| MA1 | IMG14 |
| MA2 | IMG21 |
| MA3 | IMG25 |
| MA4 | IMG28 |
| MA5 | IMG30 |
| ... | ... |

| GUI<br>AF AREA | AF-SENSOR<br>AF AREA | IMAGE-SENSOR<br>AF AREA |
|---|---|---|
| GUI1 | — | IMG1, IMG2,··· |
| GUI2 | — | IMG3, IMG4,··· |
| ... | ... | ... |
| GUI25 | MA1 | IMG51, IMG52 |
| ... | ... | ... |

IMAGE PICKUP SYSTEM, IMAGE PICKUP APPARATUS, AND PROGRAM

BACKGROUND

The present disclosure relates to image pickup systems, image pickup apparatuses, and programs.

In recent years, use of digital single-lens reflex (SLR) cameras has rapidly become widespread. However, a demand for smaller and lighter camera bodies of digital SLR cameras has not been satisfied. It is considered to be inevitable that the camera body for a digital SLR camera will be large and heavy because such a camera body will include a reflex mirror and a pentaprism. The reflex mirror is used for switching between optical paths for shooting and for a viewfinder. The pentaprism is used for guiding a subject image to an optical view finder (OVF).

Mirrorless digital SLR cameras have been introduced. Such mirrorless cameras have no reflex mirrors because an electronic viewfinder (EVF) is used instead of an OVF, thereby achieving a small and light camera body.

Such mirrorless cameras have no submirrors in addition to having no reflex mirrors. Submirrors are used for guiding incident light to a focus detection unit. As a result, a focus may not be detected by phase-difference detection in camera bodies of mirrorless cameras.

In addition, mirrorless digital SLR cameras have a flange focal length smaller than that of digital SLR cameras. Accordingly, interchangeable lenses that can be mounted on digital SLR cameras may not be used as they are with mirrorless digital SLR cameras. To utilize existing interchangeable lenses, mount adaptors are used. Interchangeable lenses for digital SLR cameras can be mounted on mirrorless digital SLR cameras via mount adaptors.

To enable mounting of interchangeable lenses compatible with phase-difference detection, an image pickup apparatus has been proposed which is used with a mount adaptor provided with a focus detection unit that detects a focus by phase-difference detection (For example, see International Publication No. 2008/099605).

In addition, a camera body for a mirrorless digital SLR camera has been proposed which has an image pickup device with phase-difference detection elements disposed on the image pickup device to achieve more rapid focus detection (For example, see Japanese Patent No. 3592147).

SUMMARY

The proposed mirrorless digital SLR camera having an image pickup device with phase-difference detection elements may have a mount adaptor mounted on the camera to utilize existing interchangeable lenses.

However, there have been no proposals of a method of detecting a focus automatically and appropriately when phase-difference detection is used in focus detection performed by an image pickup device in a camera body and performed by a focus detection unit in a mount adaptor.

It is desirable to provide an image pickup system, an image pickup apparatus, and a program which can detect a focus by using a more preferable phase-difference detection function when two phase-difference focus detection functions are used.

According to an embodiment of the present disclosure, there is provided an image pickup system which includes an image pickup apparatus and a mount adaptor configured to adjust a flange focal length between the image pickup apparatus and an interchangeable lens.

The mount adaptor includes a phase-difference focus detection unit and an optical device. The phase-difference focus detection unit can output a first phase-difference focus detection signal. The optical device separates first incident light into second incident light and third incident light. The first incident light is transmitted from the interchangeable lens. The second incident light enters the image pickup apparatus. The third incident light enters the phase-difference focus detection unit.

The image pickup apparatus includes an image pickup device and a controller. The image pickup device can output a second phase-difference focus detection signal. The controller selects either of the first phase-difference focus detection signal and the second phase-difference focus detection signal on the basis of satisfaction of a predetermined condition and performs focusing.

According to another embodiment of the present disclosure, there is provided an image pickup apparatus which includes a phase-difference focus detection unit, an image pickup device, an optical device, and a controller. The phase-difference focus detection unit can output a first phase-difference focus detection signal. The image pickup device can output a second phase-difference focus detection signal. The optical device separates first incident light into second incident light and third incident light. The first incident light is transmitted from an interchangeable lens. The second incident light enters the image pickup device. The third incident light enters the phase-difference focus detection unit. The controller selects either of the first phase-difference focus detection signal and the second phase-difference focus detection signal on the basis of satisfaction of a predetermined condition and performs focusing.

According to the image pickup system and the image pickup apparatus described above, a focus can be detected by using a more preferable phase-difference detection function when two phase-difference focus detection functions are used.

DETAILED DESCRIPTION OF EMBODIMENTS

Embodiments of the present disclosure will be described in detail below with reference to the drawings.

First Embodiment

Figure 1:
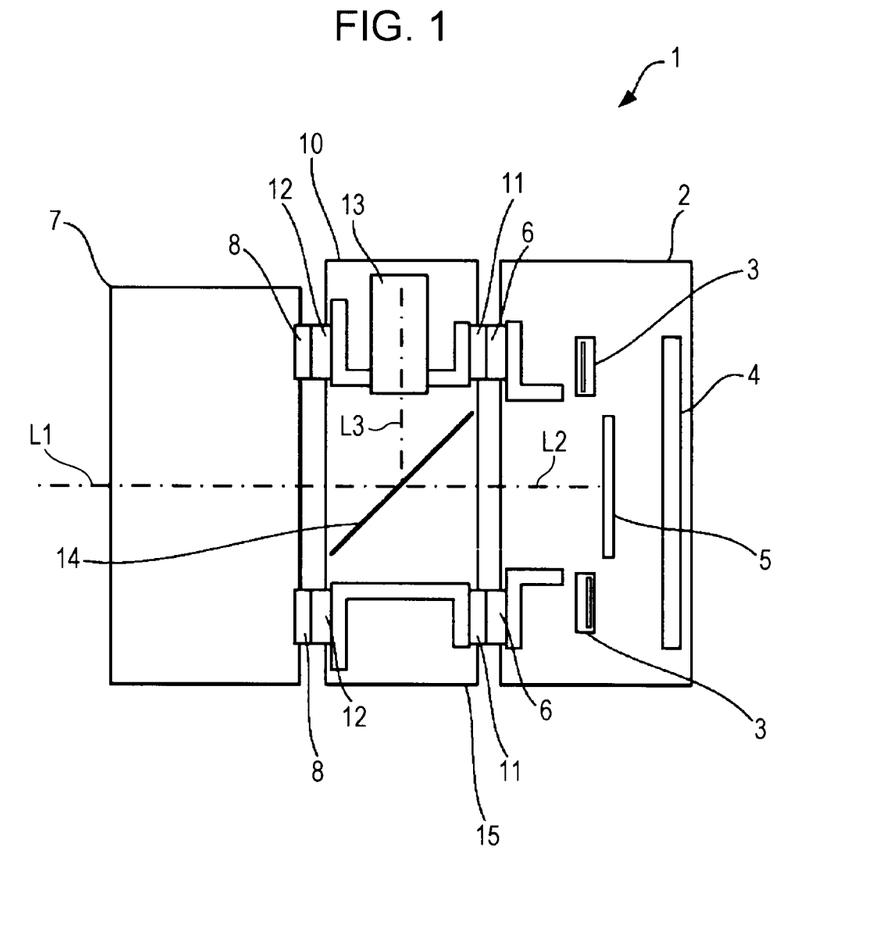
FIG. 1 is a diagram illustrating an exemplary structure of an image pickup system according to a first embodiment of the present disclosure.

An overall structure of an image pickup system 1 according to a first embodiment of the present disclosure will be described with reference to FIG. 1, which is a diagram illustrating an exemplary structure of the image pickup system 1.

The image pickup system 1 includes an image pickup apparatus (camera body) 2, a mount adaptor 10, and a lens (interchangeable lens) 7. The image pickup apparatus 2 is a camera body for a mirrorless digital single-lens reflex (SLR) camera that has a decreased size and weight due to the flange focal length of the mirrorless digital SLR camera being smaller than that of a digital SLR camera. The lens 7 is an interchangeable lens used with a digital SLR camera, and may not be directly mounted on the image pickup apparatus 2 because the desired flange focal length for the lens 7 is different from that of the image pickup apparatus 2. In addition, the lens 7 may not be mounted on the image pickup apparatus 2 because the lens 7 has an interface that is different from that of the image pickup apparatus 2.

The mount adaptor 10 is mounted between the image pickup apparatus 2 and the lens 7. The mount adaptor 10 is used for adjusting the flange focal length of a mirrorless digital SLR camera which is different from that of a digital SLR camera. Since the flange focal length of a mirrorless digital SLR camera is smaller than that of a digital SLR camera, the flange focal length is adjusted to be suitable for the lens 7 by mounting the mount adaptor 10 on the mirrorless digital SLR camera.

The image pickup apparatus 2 includes a shutter 3, a rear liquid crystal display (LCD) 4, an image pickup device 5, and a mount 6. The image pickup apparatus 2 also includes a controlling device, a battery, various operating units such as a release button, and various sensors (not illustrated).

The image pickup device 5 has photoelectric conversion cells arranged therein, and converts an optical image into electric signals. The photoelectric conversion cells include image-pickup photoelectric conversion cells for outputting image-pickup signals, and focusing photoelectric conversion cells for outputting distance-measurement signals. The image-pickup photoelectric conversion cells are uniformly arranged over the area to be imaged. The focusing photoelectric conversion cells are arranged at predetermined distance-measurement points.

The image pickup device 5 uses the image-pickup photoelectric conversion cells to detect light transmitted through the shutter 3 and to pick up an image of a subject. The image pickup device 5 also outputs image-pickup signals (i.e., an image) that are to be used for display on the rear LCD 4 which functions as an electric viewfinder (EVF). The image pickup device 5 uses the focusing photoelectric conversion cells to detect a focus for the subject and outputs focus-detection information, such as distance-measurement information, that is to be used for focusing. The image pickup device 5 may use the image-pickup photoelectric conversion cells to detect a focus by contrast detection.

The mount 6 is a connection portion for mounting a lens that is to be used with a mirrorless digital SLR camera, on the image pickup apparatus 2. The mount 6 has the form of a connection portion for holding the lens, and also has contacts for transmitting/receiving various kinds of information, such as focus-detection information (for example, distance-measurement information) and aperture-value information, between the image pickup apparatus 2 and the lens.

The mount adaptor 10 includes a mount 11, a mount 12, an autofocus (AF) sensor unit 13, a thin-film mirror (pellicle mirror) 14, and a barrel 15. The mount adaptor 10 also includes a controlling device, a display unit, and various operating units (not illustrated). The mount adaptor 10 may also have optically transparent covers (not illustrated), such as protective glass or filters, over openings on the image pickup apparatus 2 side and on the lens 7 side. The covers prevent dust from entering the mount adaptor 10, and protect the AF sensor unit 13 and the thin-film mirror 14 from damage caused by external forces.

The mount 11 is a connection portion for mounting the mount adaptor 10 on the image pickup apparatus 2. The mount 11 has the form of a connection portion for being held by the image pickup apparatus 2, and also has contacts for transmitting/receiving various kinds of information, such as focus-detection information and aperture-value information, between the image pickup apparatus 2 and the mount adaptor 10. The mount 12 is a connection portion for mounting the lens 7, which is to be used with a digital SLR camera, on the mount adaptor 10. The mount 12 has the form of a connection portion for holding the lens 7, and also has contacts for transmitting/receiving various kinds of information, such as focus-detection information and aperture-value information, between the image pickup apparatus 2 and the lens 7.

The AF sensor unit (focus detection unit) 13 includes optical members, such as a condenser lens, an infrared (IR) cut filter, an aperture mask, and a separator lens, and detects a focus by phase-difference detection with light being transmitted from a subject and entering the AF sensor. The AF sensor unit 13 outputs focus-detection information, such as distance-measurement information, that is to be used for focusing. The AF sensor unit 13 is disposed at a position located an AF-sensor focal length away from the mount surface of the lens 7. The AF-sensor focal length corresponds to the flange focal length of the digital SLR camera.

The thin-film mirror 14 is an optical device for separating light L1 into light L2 and light L3. The light L1 is transmitted from the subject side (i.e., the lens 7 side). The light L2 enters the image pickup device 5, and the light L3 enters the AF sensor unit 13. The thin-film mirror 14 is fixed and semitransparent, and separates the incident light L1 into the light L2, which is approximately 70% of the light L1, and the light L3, which is approximately 30% of the light L1, for example. Through the separation of the incident light by the thin-film mirror 14, the image pickup apparatus 2 allows the AF sensor unit 13 to detect a focus for a subject and simultaneously allows the image pickup device 5 to detect a focus for the same subject.

The barrel 15, which has a generally cylindrical shape, has the AF sensor unit 13 and the thin-film mirror 14 disposed therein. The barrel 15 has such a length that the distance from the mount surface of the lens 7 to the image pickup device 5 is equal to the flange focal length for the lens 7 when the mount adaptor 10 is mounted between the image pickup apparatus 2 and the lens 7. The barrel 15 has the AF sensor unit 13 disposed therein on the reflected optical path extending from the thin-film mirror 14.

Thus, the mount adaptor 10 enables the image pickup apparatus 2, which is a mirrorless digital SLR camera, to be equipped with the lens 7, which is to be used with a digital SLR camera, by adjusting the flange focal length.

The lens 7 is an interchangeable lens to be used with a digital SLR camera. The lens 7 includes a mount 8, and also includes a driving mechanism for driving lenses, an aperture adjustment mechanism for adjusting an aperture, and a controller for controlling the mechanisms.

The mount 8 is a connection portion for mounting the lens 7 on a digital SLR camera compatible with the lens 7. The mount 8 has the form of a connection portion for being held by the digital SLR camera, and also has contacts for transmitting/receiving various kinds of information, such as focus-detection information and aperture-value information, between the lens 7 and the digital SLR camera. The mount 8 also functions as a connection portion for mounting the lens 7 on the mount adaptor 10. Similarly to the transmission/reception of information to/from the digital SLR camera, the mount 8 can also transmit/receive various kinds of information, such as focus-detection information and aperture-value information, between the lens 7 and the mount adaptor 10. The transmission/reception of information between the lens 7 and the mount adaptor 10 may be directly performed by the controller of the lens 7 and by a controller of the mount adaptor 10, or may be performed via a controller of the image pickup apparatus 2.

Thus, the image pickup system 1 allows the AF sensor unit 13 to detect a focus by phase-difference detection and also allows the image pickup device 5 to detect a focus by phase-difference detection.

Figure 2:
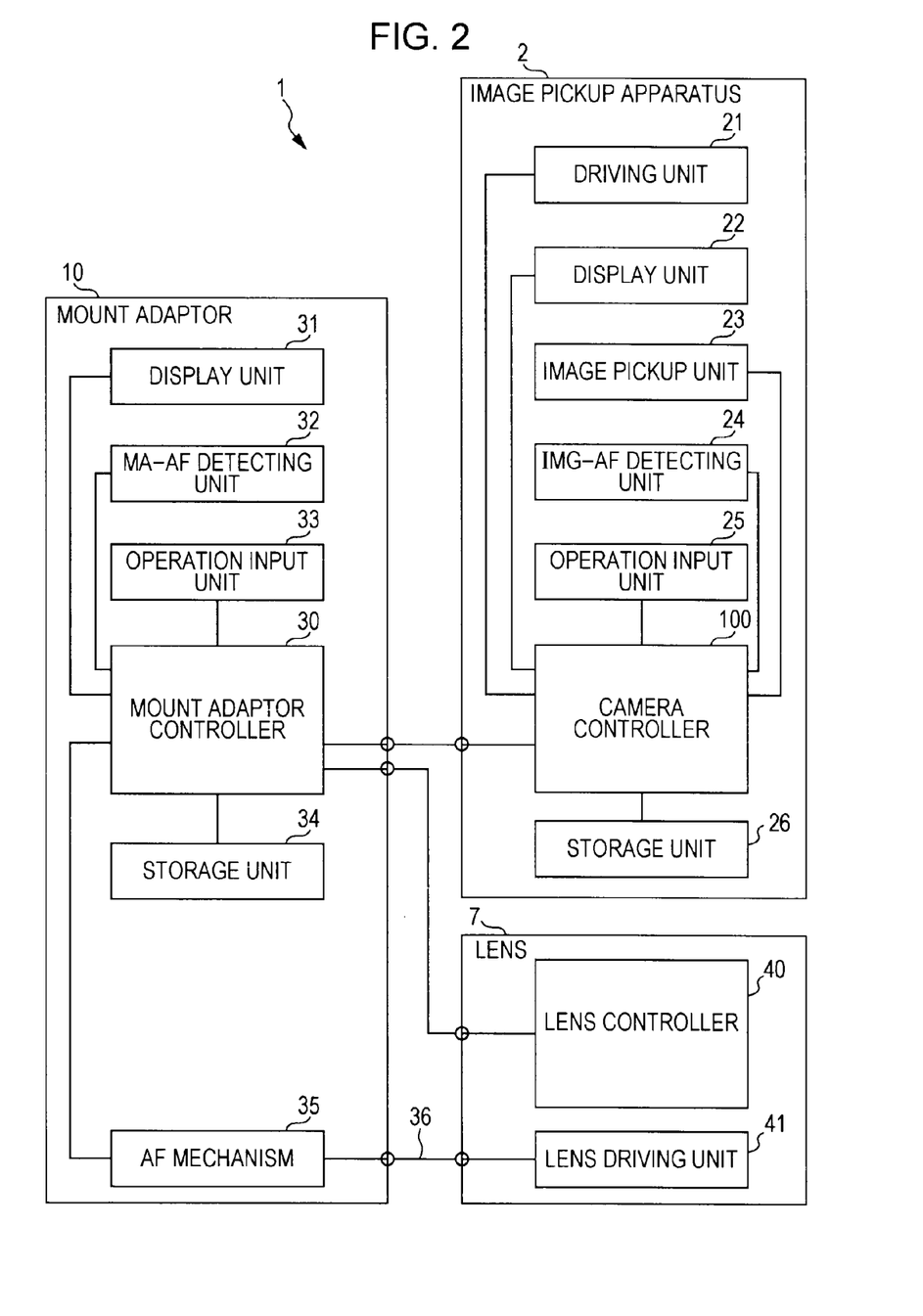
FIG. 2 is a block diagram illustrating an exemplary configuration of the image pickup system according to the first embodiment.

A block configuration of the image pickup system 1 according to the first embodiment will be described with reference to FIG. 2, which is a block diagram illustrating an exemplary configuration of the image pickup system 1.

The image pickup apparatus 2 includes a camera controller 100, a driving unit 21, a display unit 22, an image pickup unit 23, an image-pickup-apparatus autofocus (IMG-AF) detecting unit 24, an operation input unit 25, and a storage unit 26.

The driving unit 21 drives an actuator, such as a solenoid or a motor, included in the image pickup apparatus 2. For example, the driving unit 21 drives the shutter 3. The display unit 22 performs display on a display device included in the image pickup apparatus 2. For example, the display unit 22 displays an image on the rear LCD 4 so that the rear LCD 4 functions as an EVF. The display unit 22 also plays back picked-up images and displays user interface controls for various operations.

The image pickup unit 23 picks up an image of a subject by using the image pickup device 5. The IMG-AF detecting unit (i.e., a phase-difference detection unit in the image pickup device) 24 detects a focus by phase-difference detection by using the image pickup device 5. The operation input unit 25 includes a release button and other operation switches, and receives requests for selection and execution of functions of the image pickup system 1, such as an AF operation, a shutter operation, and a display switching operation.

The storage unit 26 stores correspondences (correspondence information) between distance-measurement points in the image pickup device 5 and those in the AF sensor unit 13. To retain the correspondence information even when power is turned off, the storage unit 26 is constituted by a nonvolatile storage medium, such as a flash memory or an electrically erasable programmable read only memory (EEPROM).

The camera controller 100 has overall control of the image pickup apparatus 2. The camera controller 100 also allows the IMG-AF detecting unit 24 to detect a focus, and allows a mount-adaptor autofocus (MA-AF) detecting unit 32 included in the mount adaptor 10 to detect a focus. The camera controller 100 switches between enabling and disabling of the focus detection performed by the IMG-AF detecting unit 24, and switches between enabling and disabling of the focus detection performed by the MA-AF detecting unit 32. The camera controller 100 also switches between the focus detection performed by the IMG-AF detecting unit 24 and the focus detection performed by the MA-AF detecting unit 32 in accordance with a predetermined condition.

The mount adaptor 10 includes a mount adaptor controller 30, a display unit 31, the MA-AF detecting unit 32, an operation input unit 33, a storage unit 34, and an AF mechanism 35. The mount adaptor controller 30 has overall control of the mount adaptor 10, and also transmits/receives various kinds of information to/from the camera controller 100 in the image pickup apparatus 2. The mount adaptor controller 30 also transmits/receives various kinds of information to/from a lens controller 40 in the lens 7. The mount adaptor controller 30 passes various kinds of information between the camera controller 100 and the lens controller 40 when the camera controller 100 and the lens controller 40 transmit such information to each other.

The display unit 31 displays a focusing status of the MA-AF detecting unit 32. The display unit 31 is, for example, a light emitting diode (LED), and the focusing status of the MA-AF detecting unit 32 is shown by the lighting state of the LED, such as a color or a lighting period of the LED. The focusing status includes an in-focus state, an out-of-focus state in which a focus is located in front of a subject, and an out-of-focus state in which a focus is located behind a subject.

The MA-AF detecting unit 32 (phase-difference focus detection unit) detects a focus by phase-difference detection by using the AF sensor unit 13. The operation input unit 33 includes an AF operation button and other operation switches, and receives requests for selection and execution of functions of the mount adaptor 10, such as an AF operation and a display switching operation.

The storage unit 34 stores information for identifying the mount adaptor 10, information for identifying the AF sensor unit 13, and focus-detection information of the AF sensor unit 13 (for example, distance-measurement points). To retain such information even when power is turned off, the storage unit 34 is constituted by a nonvolatile storage medium, such as a flash memory or an EEPROM.

The AF mechanism 35 includes an actuator such as a motor. An amount of driving thereof is controlled by the mount adaptor controller 30. The AF mechanism 35 is mechanically connected to a lens driving unit 41 of the lens 7, transmits driving force to the lens driving unit 41 via a driving force transmission unit 36, and drives the lenses of the lens 7 to adjust focusing. At that time, the mount adaptor controller 30 calculates an amount of driving on the basis of focusing information detected by the MA-AF detecting unit 32 or the IMG-AF detecting unit 24.

The lens 7 includes the lens controller 40 and the lens driving unit 41. The lens controller 40 has overall control of the lens 7, and transmits/receives various kinds of information to/from the mount adaptor controller 30 of the mount adaptor 10. When the lens 7 includes an aperture adjustment mechanism unit and an information display unit (not illustrated), the lens controller 40 controls these units. The lens 7 may include a driving unit for driving the lens driving unit 41. In this case, the lens controller 40 receives an instruction on the amount of driving from the mount adaptor controller 30, and drives the driving unit in accordance with the instruction.

Thus, the image pickup system 1 can detect a focus by a more preferable phase-difference detection on the basis of the focusing information detected by the MA-AF detecting unit 32 and the IMG-AF detecting unit 24.

Figure 3:
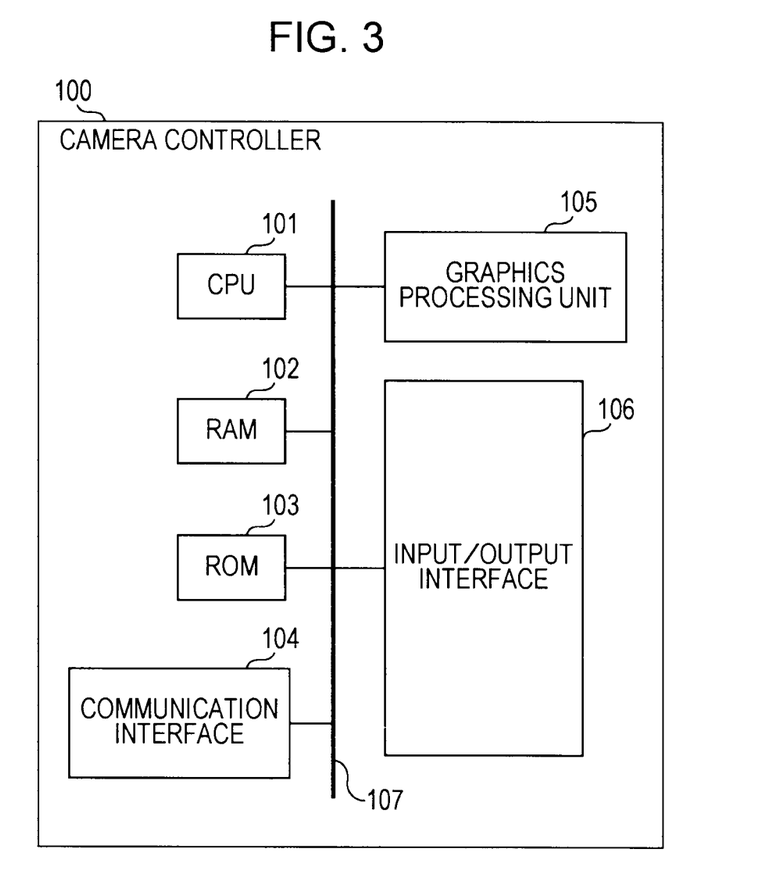
FIG. 3 is a block diagram illustrating an exemplary configuration of a camera controller according to the first embodiment.

A hardware configuration of the camera controller 100 according to the first embodiment will be described with reference to FIG. 3, which is a block diagram illustrating an exemplary configuration of the camera controller 100.

The camera controller 100 has overall control of the image pickup apparatus 2 by using a central processing unit (CPU) 101. The camera controller 100 also has overall control of the image pickup system 1 via the mount adaptor controller 30 and the lens controller 40 by using the CPU 101. The CPU 101 is connected to a random access memory (RAM) 102, a read only memory (ROM) 103, a communication interface 104, a graphics processing unit 105, and an input/output (I/O) interface 106 via a bus 107.

The RAM 102 temporarily stores at least some of programs for an operating system (OS) and application programs which are executed by the CPU 101. The RAM 102 stores various data necessary for processes executed by the CPU 101. The ROM 103 stores the OS and the application programs. The ROM 103 also stores the correspondence information.

The graphics processing unit 105 is connected to the rear LCD 4. The I/O interface 106 is connected to various input/output (I/O) devices. The various I/O devices transmit/receive information to/from the CPU 101 via the I/O interface 106 and the bus 107. The communication interface 104 transmits/receives data to/from other computers (for example, the mount adaptor controller 30 and the lens controller 40).

The above hardware configuration enables execution of processes according to the embodiment.

The camera controller 100 may include modules each of which is constituted by a field programmable gate array (FPGA) or a digital signal processor (DSP), and may have a configuration that does not include the CPU 101. In this case, the camera controller 100 includes a nonvolatile memory (for example, an EEPROM, a flash memory, or a flash-memory-type memory card) which stores firmware for the modules. The firmware can be written in the nonvolatile memory via a portable recording medium connected to the I/O interface 106 or via the communication interface 104. Thus, the camera controller 100 can update the firmware by rewriting the firmware stored in the nonvolatile memory.

The mount adaptor controller 30 and the lens controller 40 may have a configuration similar to that of the camera controller 100.

Figure 4A:
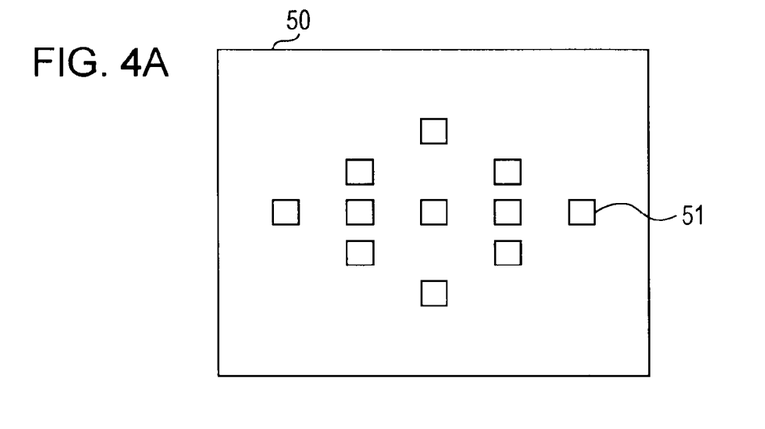
FIGS. 4A to 4C are diagrams illustrating exemplary arrangements of autofocus (AF) areas according to the first embodiment.

Now, AF areas (distance-measurement points) in the AF sensor and those in the image pickup device 5 according to the first embodiment will be described with reference to FIGS. 4A to 4C, which are diagrams illustrating exemplary arrangements of the AF areas.

An AF sensor 50 is included in the AF sensor unit 13. The AF sensor unit 13 removes unnecessary luminous flux from the light transmitted from a subject by using a field mask. The resulting light goes through the condenser lens, the IR cut filter, the aperture mask, and the separator lens, and then irradiates the AF sensor 50. Accordingly, since the AF sensor 50 has an optical system for detecting a focus precisely, the AF sensor 50 has good performance under low light conditions and has an advantage of rapid focus detection when a subject is out of focus by a large amount. The AF sensor 50 can also detect a focus precisely by using the aperture mask. On the other hand, the number and the positions of AF areas 51 which are arrayed to detect a focus are limited, and the AF areas 51 do not cover the entire area to be imaged (see FIG. 4A).

Figure 4B:
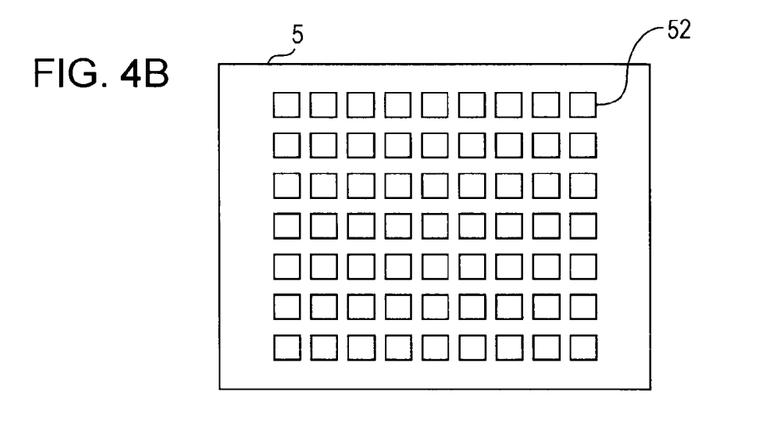
Figure 4C:
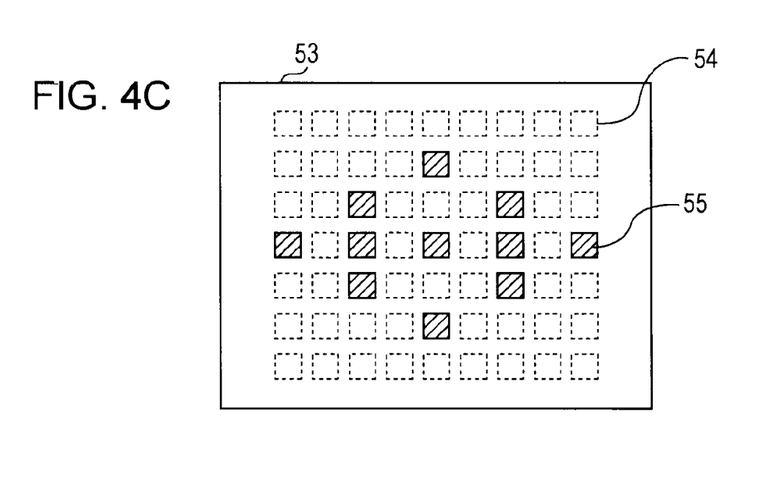

The image pickup device 5 has AF areas 52 that are uniformly disposed over the area to be imaged (see FIG. 4B). Regarding the AF areas 52, there are a wide range of choices with respect to the number and the positions of the AF areas 52. Since the AF areas 52 (the focusing photoelectric conversion cells) and the image pickup device (the image-pickup photoelectric conversion cells) are disposed on the same surface, the focus detection performed by the AF areas 52 has a high precision. On the other hand, since the focusing photoelectric conversion cells, which output distance-measurement signals, and the image-pickup photoelectric conversion cells use the same optical system, the focus detection performed by the AF areas 52 has a disadvantage in terms of performance in low light conditions and of rapid focus detection compared with the AF sensor 50.

A superimposed image 53 is obtained by superimposing the AF areas 51 and the AF areas 52 in the area to be imaged. Many AF areas 52 can be disposed over the entire area to be imaged, compared with the AF areas 51. The AF areas 51 and the AF areas 52 have shared areas 55 in some portions, and have non-shared areas 54 in the other portions (see FIG. 4C).

Figure 5:
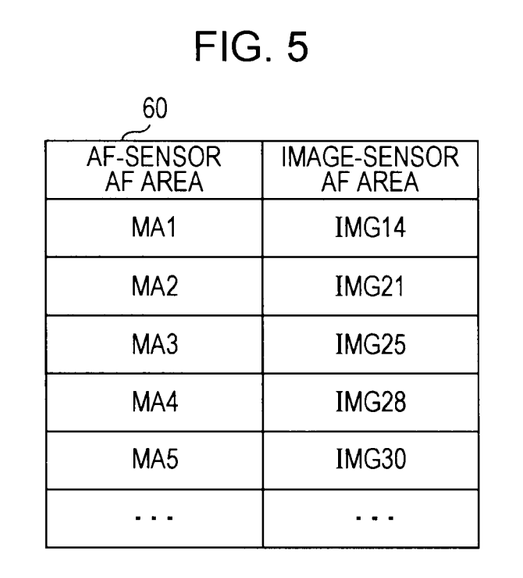
FIG. 5 is a diagram illustrating an AF-area correspondence table according to the first embodiment.

An AF-area correspondence table stored in the storage unit 26 according to the first embodiment will be described with reference to FIG. 5, which is a diagram illustrating the AF-area correspondence table.

The storage unit 26 stores an AF-area correspondence table 60. The AF-area correspondence table 60 shows correspondences between the AF areas (AF-sensor AF areas) 51 of the AF sensor unit 13 and the AF areas (image-sensor AF areas) 52 of the image pickup device 5. For example, MA1, which is one of the AF areas 51 of the AF sensor unit 13, corresponds to IMG14, which is one of the AF areas 52 of the image pickup device 5. Note that a correspondence between an AF area 51 and an AF area 52 means that focus detection for the same area of a subject is performed by the AF area 51 and the AF area 52.

The AF-area correspondence table 60 shows the correspondences with respect to the AF areas 51 each of which corresponds to no AF areas 52 or to one or more AF areas 52. In general, since the number of the AF areas 51 is smaller than that of the AF areas 52, the camera controller 100 can more easily determine the correspondences on the basis of the AF areas 51.

Figure 6:
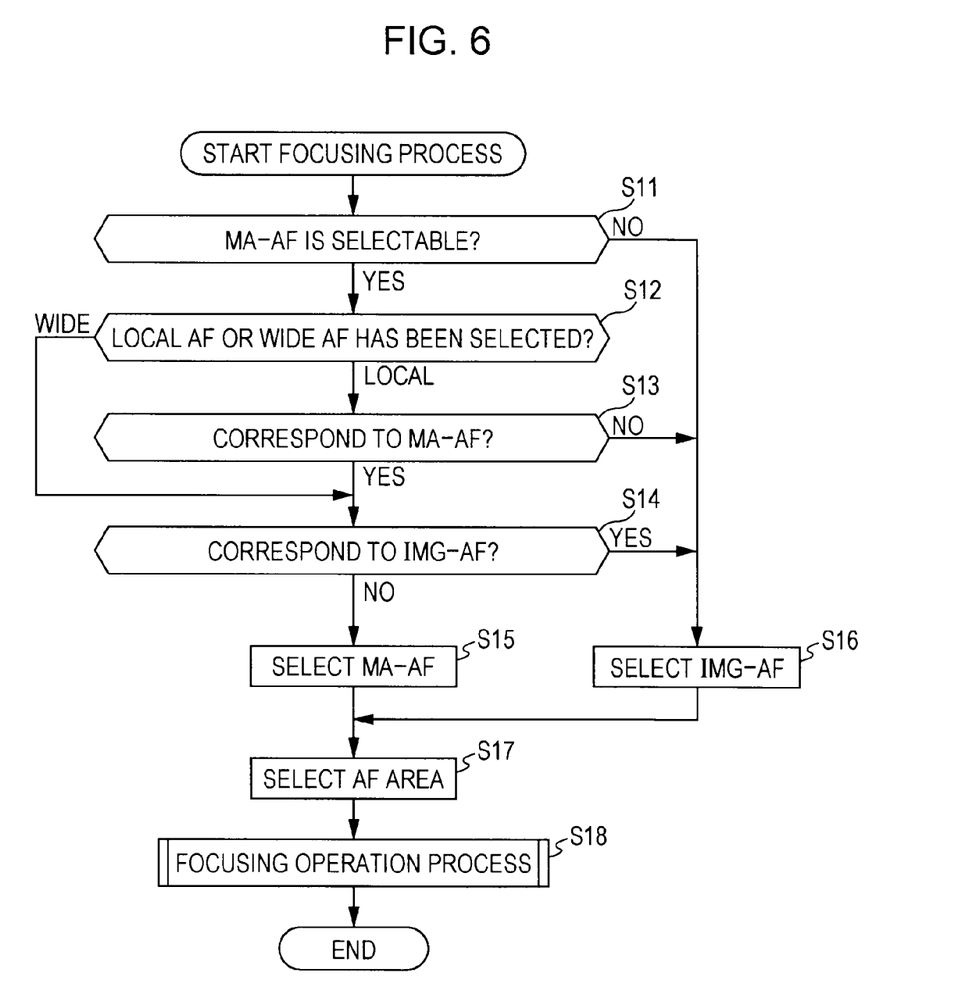
FIG. 6 is a flowchart of a focusing process according to the first embodiment.

A focusing process performed by the camera controller 100 will be described with reference to FIG. 6, which is a flowchart of the focusing process according to the first embodiment. The camera controller 100 performs the focusing process when an image is to be picked up.

In step S11, the camera controller 100 determines whether or not the MA-AF detecting unit 32 (hereinafter, referred to as the MA-AF) is selectable. This determination can be performed by detecting the mount adaptor 10 mounted on the image pickup apparatus 2. The camera controller 100 can obtain identification information of the mount adaptor 10 from the mount adaptor controller 30, and determine whether or not the mount adaptor 10 has an AF sensor. Alternatively, the camera controller 100 may obtain AF sensor information, such as information about the presence/absence of the AF sensor or the AF areas, from the mount adaptor controller 30, and determine whether or not the MA-AF is selectable. When the camera controller 100 determines that the MA-AF is selectable, the camera controller 100 proceeds to step S12. Otherwise, the camera controller 100 proceeds to step S16. Instead, the camera controller 100 may prohibit the selection of the MA-AF in initial settings, and when the camera controller 100 detects mounting of a mount adaptor having an AF sensor, the camera controller 100 may set the MA-AF to be selectable.

In step S12, the camera controller 100 receives selection of the distance-measurement points. When distance-measurement points in a local area (hereinafter, referred to as local distance-measurement points) have been selected, the camera controller 100 proceeds to step S13. When distance-measurement points over a wide area (hereinafter, referred to as wide distance-measurement points) have been selected, the camera controller 100 proceeds to S14. Thus, when local distance-measurement points have been selected, the camera controller 100 gives high priority to the focus detection performed by the MA-AF. When wide distance-measurement points have been selected, the camera controller 100 gives high priority to the focus detection performed by the IMG-AF detecting unit 24 (hereinafter, referred to as the IMG-AF).

In step S13, the camera controller 100 determines whether or not the selected local distance-measurement points correspond to the MA-AF focus detection. For example, when at least one AF area 51 is located at the selected local distance-measurement points, the camera controller 100 determines that the selected local distance-measurement points correspond to the MA-AF focus detection. When no AF areas 51 are located at the selected local distance-measurement points, that is, when only the AF areas 52 are located at the selected local distance-measurement points, the camera controller 100 determines that the selected local distance-measurement points do not correspond to the MA-AF focus detection. When the camera controller 100 determines that the selected local distance-measurement points do not correspond to the MA-AF focus detection, the camera controller 100 proceeds to step S16. Otherwise, the camera controller 100 proceeds to step S14.

In step S14, the camera controller 100 determines whether or not conditions for detecting a focus (hereinafter, referred to as focus detection conditions) correspond to the IMG-AF focus detection. When the camera controller 100 determines that the focus detection conditions correspond to the IMG-AF focus detection, the camera controller 100 proceeds to step S16. Otherwise, the camera controller 100 proceeds to step S15. Basically, the camera controller 100 usually selects the IMG-AF focus detection. However, when the focus detection conditions are not suitable for the IMG-AF focus detection, the camera controller 100 selects the MA-AF focus detection. For example, the camera controller 100 selects the MA-AF focus detection when the precision of the IMG-AF focus detection is low, when a subject is out of focus by a large amount, or when a subject is lit under low light conditions. The camera controller 100 may prohibit the selection of the IMG-AF when the camera controller 100 detects focus detection conditions under which the precision of the IMG-AF focus detection is low.

In step S15, the camera controller 100 selects the MA-AF focus detection.

In step S16, the camera controller 100 selects the IMG-AF focus detection.

In step S17, the camera controller 100 selects AF areas to be used for focus detection, from the AF areas 51 or the AF areas 52 that correspond to the selected distance-measurement points. For example, the camera controller 100 selects an AF area with which a subject can be focused upon over the shortest distance.

In step S18, the camera controller 100 detects a focus by using the selected AF areas (executes a focusing operation process), and the focusing process is ended.

Thus, the camera controller 100 controls two selections: a first selection in which the IMG-AF is selected by determining whether or not the MA-AF is selectable for detecting a focus; and a second selection in which the MA-AF or the IMG-AF is selected in accordance with the focus detection conditions.

Through the two selections, the image pickup system 1 can detect a focus by a more preferable phase-difference detection among the phase-difference focus detection performed by the MA-AF and the phase-difference focus detection performed by the IMG-AF.

Second Embodiment

Figure 7:
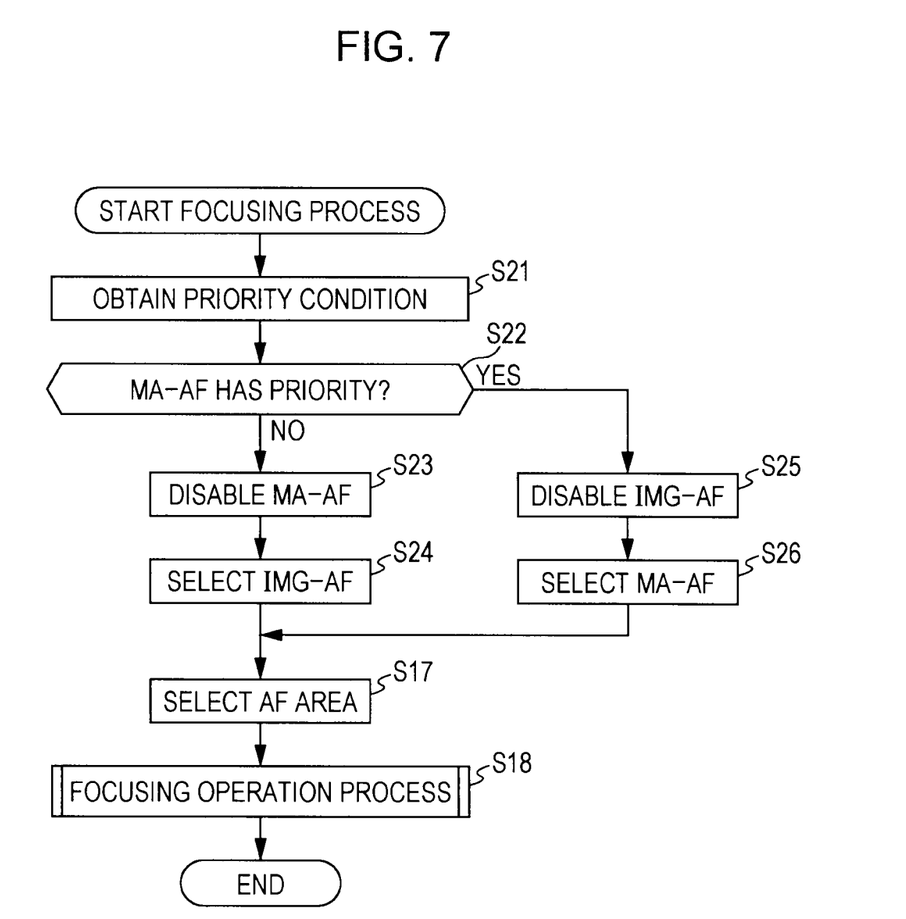
FIG. 7 is a flowchart of a focusing process according to a second embodiment of the present disclosure.

A focusing process according to a second embodiment of the present disclosure will be described with reference to FIG. 7, which is a flowchart of the focusing process. The camera controller 100 performs the focusing process when an image is to be picked up. The second embodiment is different from the first embodiment as follows. According to the second embodiment, the MA-AF or the IMG-AF is set to have priority and is selected in accordance with the priority, whereas, according to the first embodiment, the MA-AF or the IMG-AF is selected in accordance with the focus detection conditions. In the detailed description of the second embodiment, the overall configuration of the image pickup system according to the second embodiment is the same as that according to the first embodiment, unless otherwise specified.

In step S21, the camera controller 100 obtains a priority condition for the MA-AF or the IMG-AF. The priority condition describes a priority that is set to the MA-AF or the IMG-AF in advance, and is stored in the storage unit 26. Priority conditions may be set for different conditions, such as a shooting mode. When the camera controller 100 does not detect the mount adaptor 10 (i.e., the AF sensor unit 13), the camera controller 100 does not select the MA-AF regardless of the priority condition.

In step S22, the camera controller 100 determines whether or not priority is set to the MA-AF. When the camera controller 100 determines that priority is set to the MA-AF, the camera controller 100 proceeds to step S25. Otherwise, the camera controller 100 proceeds to step S23. In step S23, the camera controller 100 disables the MA-AF.

In step S24, the camera controller 100 selects the IMG-AF focus detection.

In step S25, the camera controller 100 disables the IMG-AF.

In step S26, the camera controller 100 selects the MA-AF focus detection.

After that, similarly to as in the first embodiment, the camera controller 100 executes steps S17 and S18, and ends the focusing process.

Use of the priority condition achieves a simple control sequence in the image pickup system 1. In addition, users easily understand which among the MA-AF and the IMG-AF is to be used for focusing performed by the image pickup system 1.

Third Embodiment

Figure 8:
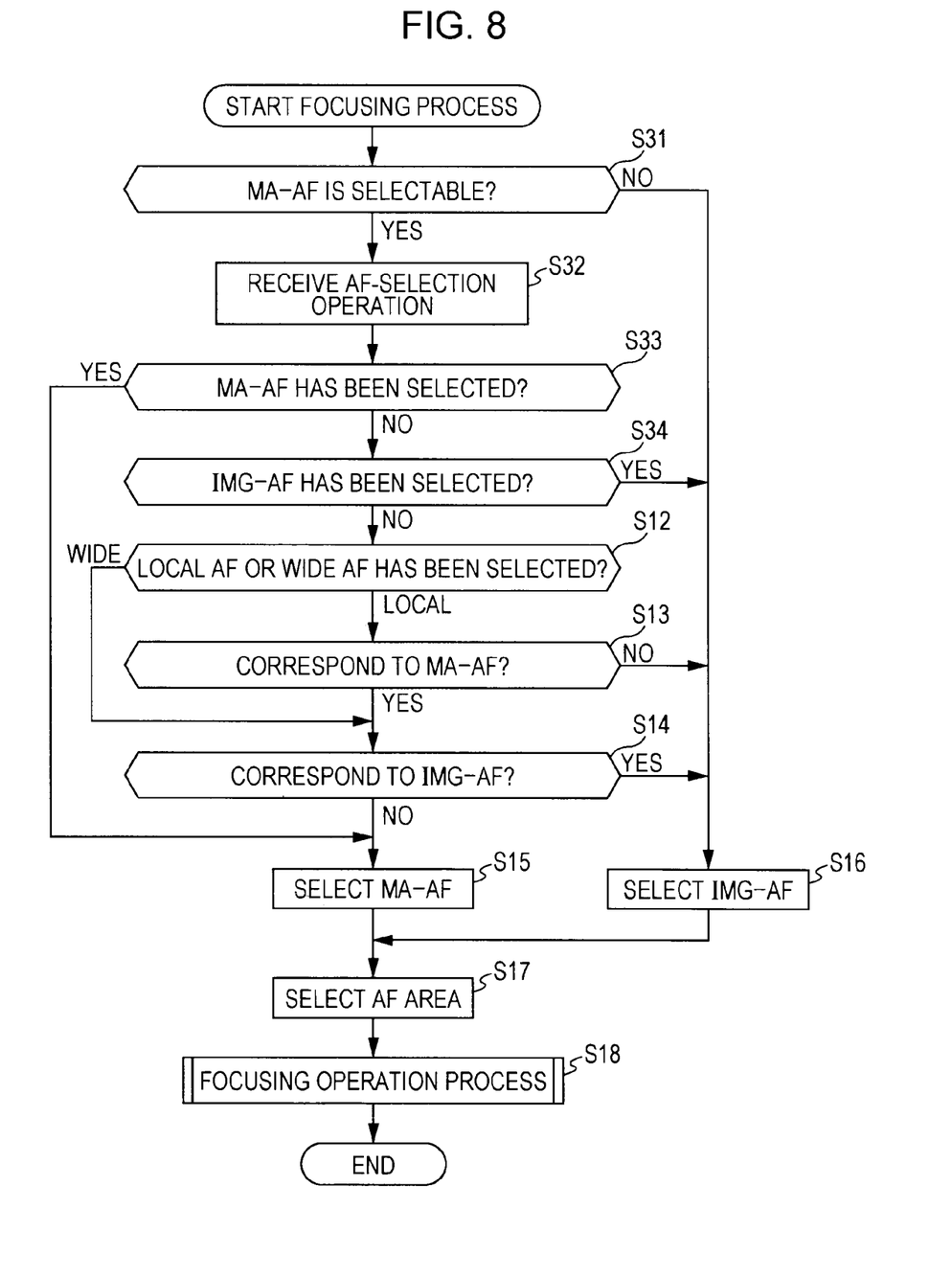
FIG. 8 is a flowchart of a focusing process according to a third embodiment of the present disclosure.

A focusing process according to a third embodiment of the present disclosure will be described with reference to FIG. 8, which is a flowchart of the focusing process. The camera controller 100 performs the focusing process when an image is to be picked up. The third embodiment is different from the first embodiment in that the camera controller 100 receives a selection operation indicating which among the MA-AF and the IMG-AF is to be used for focusing. In the detailed description of the third embodiment, the overall configuration of the image pickup system according to the third embodiment is the same as that according to the first embodiment, unless otherwise specified.

In step S31, the camera controller 100 determines whether or not the MA-AF is selectable. This determination can be performed by detecting the mount adaptor 10 mounted on the image pickup apparatus 2. The camera controller 100 can obtain identification information of the mount adaptor 10 from the mount adaptor controller 30, and determine whether or not the mount adaptor 10 has an AF sensor. Alternatively, the camera controller 100 may obtain AF sensor information, such as information about the presence/absence of the AF sensor or the AF areas, from the mount adaptor controller 30, and determine whether or not the MA-AF is selectable. When the camera controller 100 determines that the MA-AF is selectable, the camera controller 100 proceeds to step S32. Otherwise, the camera controller 100 proceeds to step S16.

In step S32, the camera controller 100 receives an AF-selection operation indicating which among the MA-AF and the IMG-AF is to be used for focusing. A user can perform the AF-selection operation by using the operation input unit 25 or the operation input unit 33.

In step S33, when the camera controller 100 has received the selection of the MA-AF, the camera controller 100 proceeds to step S15. Otherwise, the camera controller 100 proceeds to S34.

In step S34, when the camera controller 100 has received the selection of IMG-AF, the camera controller 100 proceeds to step S16. Otherwise, that is, when the camera controller 100 has received no selection of the MA-AF or the IMG-AF, the camera controller 100 proceeds to step S12 and selects the MA-AF or the IMG-AF in accordance with the focus detection conditions.

After that, similarly to as in the first embodiment, the camera controller 100 executes steps S12 to S18, and ends the focusing process.

Through the selection operation, users easily understand which among the MA-AF and the IMG-AF is to be used for focusing performed by the image pickup system 1. In addition, even when the users do not select the MA-AF or the IMG-AF, the image pickup system 1 can detect a focus by a more preferable phase-difference detection among the phase-difference focus detection performed by the MA-AF and the phase-difference focus detection performed by the IMG-AF.

Fourth Embodiment

Figure 9:
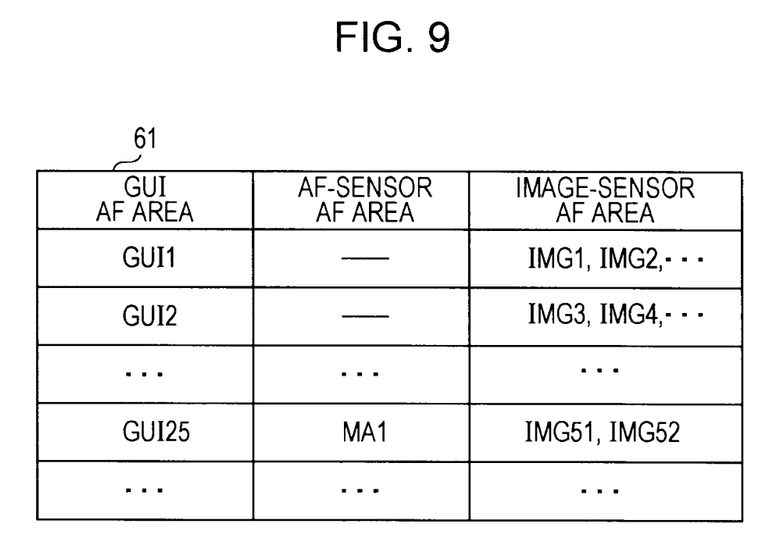
FIG. 9 is a diagram illustrating an AF-area correspondence table according to a fourth embodiment of the present disclosure.

An AF-area correspondence table stored in the storage unit 26 according to a fourth embodiment of the present disclosure will be described with reference to FIG. 9, which is a diagram illustrating the AF-area correspondence table. In the detailed description of the fourth embodiment, the overall configuration of the image pickup system according to the fourth embodiment is the same as that according to the first embodiment, unless otherwise specified.

The storage unit 26 stores an AF-area correspondence table 61. The AF-area correspondence table 61 shows correspondences among AF areas (GUI AF areas) of a graphical user interface (GUI), the AF areas (AF-sensor AF areas) 51 of the AF sensor unit 13, and the AF areas (image-sensor AF areas) 52 of the image pickup device 5. The GUI AF areas are those displayed on the rear LCD 4 when a user is to select distance-measurement points. The GUI AF areas are defined as grid cells into which the area to be imaged is uniformly divided. Each of the grid cells can be identified.

For example, GUI1, which is a GUI AF area, corresponds to no AF areas of the AF sensor unit 13 and corresponds to IMG1, IMG2, etc., which are AF areas of the image pickup device 5. Another example is that GUI25, which is a GUI AF area, corresponds to MA1, which is an AF area of the AF sensor unit 13, and corresponds to IMG51 and IMG52, which are AF areas of the image pickup device 5.

Through the use of the AF-area correspondence table 61, it is not necessary for the AF areas 52 of the image pickup device 5 to correspond to the AF areas 51 of the AF sensor unit 13 directly. The AF areas 52 may indirectly correspond to the AF areas 51 via the GUI AF areas. Accordingly, the image pickup system 1 is flexible in that any combination of the image pickup apparatus 2 and the mount adaptor 10 can be used in the image pickup system 1.

Fifth Embodiment

Figure 10:
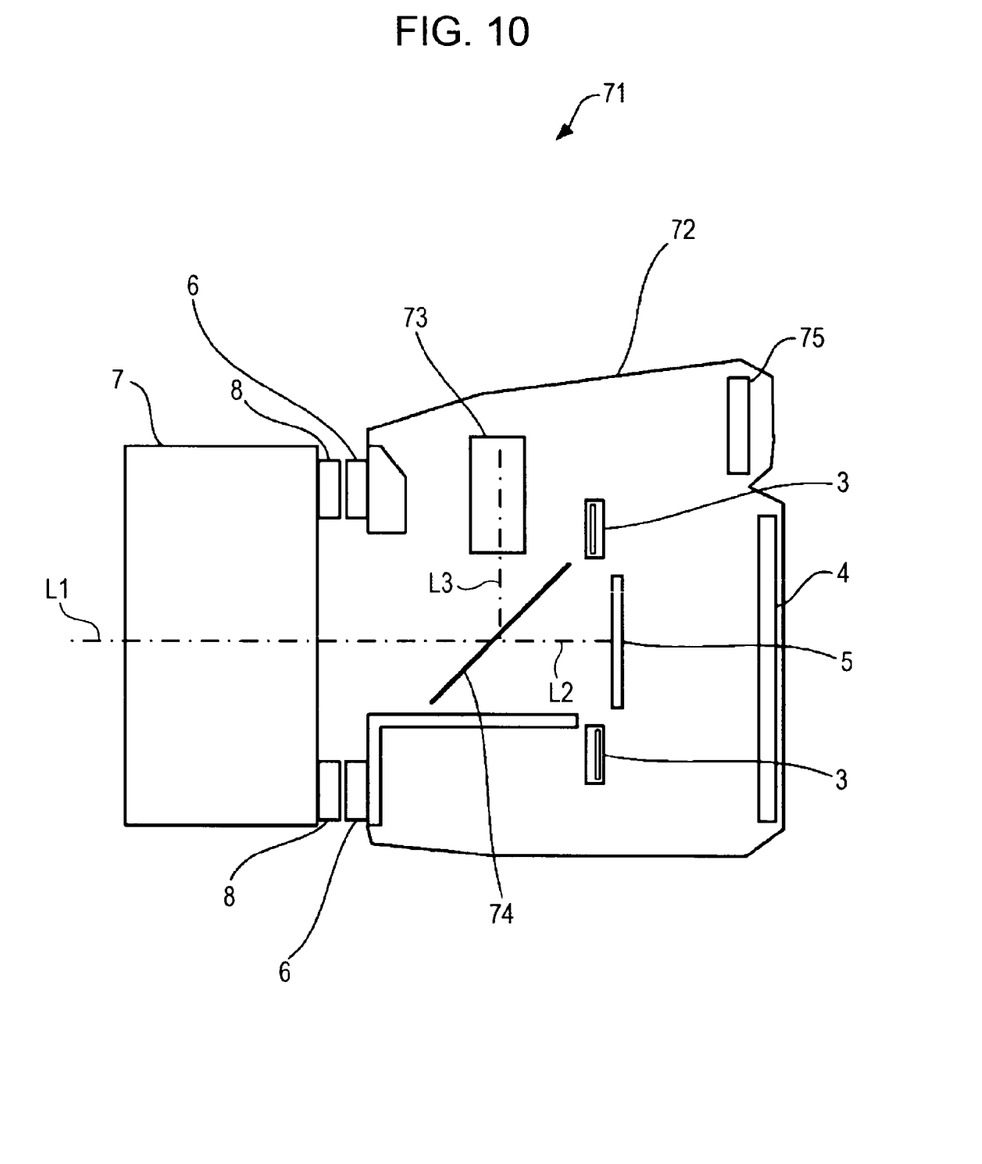
FIG. 10 is a diagram illustrating an exemplary structure of an image pickup system according to a fifth embodiment of the present disclosure.

An overall structure of an image pickup system according to a fifth embodiment of the present disclosure will be described with reference to FIG. 10, which is a diagram illustrating an exemplary structure of the image pickup system. In the detailed description of the fifth embodiment, the overall configuration of the image pickup system according to the fifth embodiment is the same as that according to the first embodiment, unless otherwise specified.

An image pickup system 71 includes an image pickup apparatus (camera body) 72 and the lens (interchangeable lens) 7. The image pickup apparatus 72 is a camera body for a digital SLR camera. The image pickup apparatus 72 includes a thin-film mirror (pellicle mirror) 74 instead of a reflex mirror.

The image pickup apparatus 72 includes the shutter 3, the rear LCD 4, the image pickup device 5, the mount 6, an AF sensor unit 73, the thin-film mirror 74, and an EVF 75. The image pickup apparatus 72 also includes a controlling device, a battery, various operating units such as a release button, and various sensors (not illustrated).

The AF sensor unit (focus detection unit) 73 includes optical members, such as a condenser lens, an IR cut filter, an aperture mask, and a separator lens, and detects a focus by phase-difference detection with light being transmitted from a subject and entering the AF sensor. The AF sensor unit 73 outputs focus-detection information, such as distance-measurement information, that is to be used for focusing.

The thin-film mirror 74 is an optical device for separating light L1 into light L2 and light L3. The light L1 is transmitted from the subject side (i.e., the lens 7 side). The light L2 enters the image pickup device 5, and the light L3 enters the AF sensor unit 73. The thin-film mirror 74 is fixed and semitransparent, and separates the incident light L1 into the light L2, which is approximately 70% of the light L1, and the light L3, which is approximately 30% of the light L1, for example. Through the separation of the incident light by the thin-film mirror 74, the image pickup apparatus 72 allows the AF sensor unit 73 to detect a focus for a subject and simultaneously allows the image pickup device 5 to detect a focus for the same subject.

The EVF 75 displays an image in accordance with image-pickup signals that are output from the image pickup device 5.

Thus, the image pickup system 71 allows the AF sensor unit 73 to detect a focus by phase-difference detection and allows the image pickup device 5 to detect a focus by phase-difference detection.

The above-described processes can be executed by a computer. In this case, programs are provided which describe processes of functions which the units desirably have. Execution of these programs on a computer causes the above-described processes to be executed on the computer. Such programs can be stored in a computer-readable recording medium.

When the programs are to be commercialized, a portable recording medium, such as a digital versatile disc (DVD) or a compact disc read only memory (CD-ROM), storing the programs may be released onto the market, for example. Additionally, the programs stored in a storage device of a server computer may be transferred from the server computer to another computer over networks.

A computer that is to execute the programs stores these programs, which are, for example, recorded on a portable recording medium or transferred from the server computer, in a storage device of the computer. The computer then reads the programs from the storage device and executes processes according to the programs.

The embodiments described above can be changed without departing from the spirit of the present disclosure.

In addition, many modifications and changes can be made to the embodiments described above by those skilled in the art, and the present disclosure is not limited to the exact configurations and exemplary applications described above.

The present disclosure contains subject matter related to that disclosed in Japanese Priority Patent Application JP 2010-289483 filed in the Japan Patent Office on Dec. 27, 2010, the entire contents of which are hereby incorporated by reference.

What is claimed is:

1. An image pickup system comprising:
an image pickup apparatus; and
a mount adaptor operable to adjust a flange focal length between the image pickup apparatus and an interchangeable lens,
wherein the mount adaptor comprises:
a phase-difference focus detection unit operable to output a first phase-difference focus detection signal, wherein the first phase-difference focus detection signal corresponds to a plurality of distance-measurement points of the phase-difference focus detection unit, and
an optical device operable to separate a first incident light into a second incident light and a third incident light, wherein the first incident light is transmitted from the interchangeable lens, wherein the second incident light enters the image pickup apparatus, wherein the third incident light enters the phase-difference focus detection unit, and
wherein the image pickup apparatus comprises:
an image pickup device operable to output a second phase-difference focus detection signal, wherein the second phase-difference focus detection signal corresponds to a plurality of distance-measurement points of the image pickup device and wherein the plurality of distance-measurement points of the phase-difference focus detection unit are less in number than the plurality of distance-measurement points of the image pickup device, and
a controller operable to select either of the first phase-difference focus detection signal and the second phase-difference focus detection signal based on the satisfaction of a predetermined condition and operable to perform focusing.

2. The image pickup system according to claim 1, wherein the controller selects the first phase-difference focus detection signal when the controller detects mounting of the mount adaptor.

3. The image pickup system according to claim 1, wherein the controller selects the first phase-difference focus detection signal when the controller detects the phase-difference focus detection unit.

4. The image pickup system according to claim 1, wherein the controller selects the first phase-difference focus detection signal when a condition for determining that the second phase-difference focus detection signal is selectable is not satisfied.

5. The image pickup system according to claim 1, wherein the controller selects the first phase-difference focus detection signal when selection of the second phase-difference focus detection signal is prohibited.

6. The image pickup system according to claim 1, wherein the controller selects the second phase-difference focus detection signal when a condition for determining that the first phase-difference focus detection signal is selectable is not satisfied.

7. The image pickup system according to claim 1, wherein the controller selects the second phase-difference focus detection signal when selection of the first phase-difference focus detection signal is prohibited.

8. The image pickup system according to claim 1,
wherein the image pickup apparatus or the mount adaptor comprises a selector operable to receive an operation of selecting either of the first phase-difference focus detection signal and the second phase-difference focus detection signal, and
wherein the controller selects either of the first phase-difference focus detection signal and the second phase-difference focus detection signal in accordance with the operation.

9. The image pickup system according to claim 1,
wherein the image pickup apparatus includes a distance-measurement point selector operable to select a distance-measurement point from a plurality of distance-measurement points displayed on the distance-measurement point selector, and
wherein the controller selects the second phase-difference focus detection signal when the first phase-difference focus detection signal does not correspond to the selected distance-measurement point.

10. The image pickup system according to claim 9, wherein the controller selects either of the first phase-difference focus detection signal and the second phase-difference focus detection signal in accordance with a focus detection condition when the first phase-difference focus detection signal and the second phase-difference focus detection signal correspond to the selected distance-measurement point.

11. The image pickup system according to claim 9,
wherein the controller includes a storage unit operable to store a correspondence information describing the correspondence between the plurality of distance-measurement points for the first phase-difference focus detection signal and the plurality of distance-measurement points for the second phase-difference focus detection signal, and
wherein the controller determines the correspondence between the plurality of distance-measurement points for the first phase-difference focus detection signal and the plurality of distance-measurement points for the second phase-difference focus detection signal based on the correspondence information.

12. The image pickup system according to claim 11, wherein the correspondence information describes a correspondence among an option presented to a user by the distance-measurement point selector, the plurality of distance-measurement points for the first phase-difference focus detection signal, and the plurality of distance-measurement points for the second phase-difference focus detection signal.

13. The image pickup system according to claim 1, wherein after the controller determines which is to be selected among the first phase-difference focus detection signal and the second phase-difference focus detection signal, the controller selects a distance-measurement point from the plurality of distance-measurement points and detects a focus.

14. The image pickup system according to claim 1, wherein the plurality of distance-measurement points of the phase-difference focus detection unit cover a portion of an entire area to be imaged.

15. The image pickup system according to claim 1, wherein the plurality of distance-measurement points of the image pickup device is uniformly disposed over an area to be imaged.

16. The image pickup system according to claim 1, wherein the second incident light is 70% of the first incident light and the third incident light is 30% of the first incident light.

17. An image pickup apparatus comprising:
   a phase-difference focus detection unit operable to output a first phase-difference focus detection signal, wherein the first phase-difference focus detection signal corresponds to a plurality of distance-measurement points in the phase-difference focus detection unit;
   an image pickup device operable to output a second phase-difference focus detection signal, wherein the second phase-difference focus detection signal corresponds to a plurality of distance-measurement points of the image pickup device and wherein the plurality of distance-measurement points of the phase-difference focus detection unit are less in number than the plurality of distance-measurement points of the image pickup device;
   an optical device operable to separate a first incident light into a second incident light and a third incident light, wherein the first incident light is transmitted from an interchangeable lens, the second incident light enters the image pickup device, and the third incident light enters the phase-difference focus detection unit; and
   a controller operable to select either of the first phase-difference focus detection signal and the second phase-difference focus detection signal on the basis of satisfaction of a predetermined condition and operable to perform focusing.

18. A non-transitory computer readable medium having stored thereon, a computer program having at least one code section executable by a computer, thereby causing the computer to perform the steps comprising:
   outputting a first phase-difference focus detection signal by a phase-difference focus detection unit, wherein the first phase-difference focus detection signal corresponds to a plurality of distance-measurement points in the phase-difference focus detection unit;
   outputting a second phase-difference focus detection signal by an image pickup device, wherein the second phase-difference focus detection signal corresponds to a plurality of distance-measurement points of the image pickup device and wherein the plurality of distance-measurement points of the phase-difference focus detection unit are less in number than the plurality of distance-measurement points of the image pickup device;
   separating a first incident light into a second incident light and a third incident light by an optical device, wherein the first incident light is transmitted from an interchangeable lens, the second incident light enters the image pickup device, and the third incident light enters the phase-difference focus detection unit;
   selecting either of the first phase-difference focus detection signal and the second phase-difference focus detection signal on the basis of satisfaction of a predetermined condition; and
   focusing based on the selection.

* * * * *